US008254919B2

(12) United States Patent
Gupta et al.

(10) Patent No.: US 8,254,919 B2
(45) Date of Patent: Aug. 28, 2012

(54) SELECTIVELY TERMINATING CAMEL DIALOGUES

(75) Inventors: Rajeev Gupta, Bangalore (IN); Anish Sharma, Bangalore (IN); Sandeep Patel, Bangalore (IN)

(73) Assignee: Sonus Networks, Inc., Westford, MA (US)

( * ) Notice: Subject to any disclaimer, the term of this patent is extended or adjusted under 35 U.S.C. 154(b) by 0 days.

(21) Appl. No.: 12/814,848

(22) Filed: Jun. 14, 2010

(65) Prior Publication Data

US 2011/0306331 A1    Dec. 15, 2011

(51) Int. Cl.
*H04W 88/02*    (2009.01)
(52) U.S. Cl. ..................................... 455/432.1
(58) Field of Classification Search ............... 455/432.1, 455/417, 422.1, 433, 450
See application file for complete search history.

(56) References Cited

U.S. PATENT DOCUMENTS

| 2006/0252425 A1* | 11/2006 | Jiang ........................... 455/432.1 |
| 2009/0081988 A1 | 3/2009 | Kazmi |
| 2010/0190492 A1* | 7/2010 | Jiang ........................... 455/432.1 |
| 2011/0045828 A1* | 2/2011 | Madan et al. .................. 455/433 |
| 2011/0124331 A1* | 5/2011 | Jiang ........................... 455/432.1 |

OTHER PUBLICATIONS

ETSI TS 123 035 V5.1.0 (Sep. 2002) Technical Specification, 3 GPPTS by 23.035 version 5.1.0 Release 5, European Telecommunications Standards Institute, 2002, 12 pages.
Z. Ghadialy, Camel: An Introduction; http://www.3g4g.co.uk/Tutorial/ZG/zg_camel.html; Jul. 25, 2004 pp. 1-8.
Trillium CAP Protocol Software, Continuous Computing (CCPU), http://www.ccpu.com/trillium-protocol-software-products/all-protocols-list/cap-camel-application-part/; 2010; pp. 1-2.

* cited by examiner

*Primary Examiner* — Diane Mizrahi

(57) ABSTRACT

Described are methods and apparatuses, for selectively terminated custom application in a telecommunications network. A Gateway Mobile Switching Center (GMSC) receives a request to initiate a call session to a subscriber device in a service area of a first Mobile Switching Center (MSC). The GMSC established a dialogue to implement the custom application on the subscriber device. The GMSC receives a message indicating that the subscriber device is moving from the first MSC to a second MSC. The GMSC analyzes a service key of the custom application to determine if the dialogue should be terminated and determines that the dialogue should be terminated so that the custom application is continued on the subscriber device.

13 Claims, 3 Drawing Sheets

SELECTIVELY TERMINATING CAMEL DIALOGUES

FIELD OF THE INVENTION

The invention relates generally to computer-based methods and apparatuses, including computer program products, for a Gateway Mobile Switching Center (GMSC) to selectively terminate and initiate custom applications when Mobile Terminating Roaming Retry (MTRR) is supported by the GMSC.

BACKGROUND

The Global System for Mobile Communications (GSM) is one or more networks that execute cell phone calls. GSM networks include various network elements that are used to complete a call. For example, GSM networks can include a Home Location Register (HLR), Mobile Switching Center (MSC), and Gateway Mobile Switching Center (GMSC). In addition to providing call connections, mobile provider networks provide Intelligent Network (IN) services to enhance service provided to customers. Video downloads, music downloads, prepaid service, automated call forwarding, and ring-back tone services are a few of such enhanced services. Enhanced services can be implemented using Customized Applications for Mobile Network Enhanced Logic (CAMEL) protocol.

CAMEL protocol is a set of standards defined by European Telecommunication Standardization Institute (ETSI). Subsequently, Third Generation Partnership Project (3GPP) defined upgrades to the CAMEL protocol. CAMEL protocol enables service providers to continue to service their subscribers with enhanced services even when a subscriber is roaming outside of their home network.

When a call is made to a subscriber's equipment (commonly referred to as user equipment (UE)), a GMSC establishes CAMEL Application Protocol (CAP) dialogues to supply services to the UE. Simultaneously, an MSC that is connected to the GMSC and servicing the UE pages the UE. When the UE moves from a location that is covered by the MSC to a location that is covered by a second MSC, the UE sends out a location update to the second MSC. Location update is described in 3GPP TS 23.018.

If a first MSC receives a call to a UE while the UE is moving from a geographic location served by the first MSC to a geographic location served by the second MSC, the first MSC sends a paging message to the UE at the same time that the UE is in the process of a location update. Thus, the UE does not respond to the paging message and the first MSC can not establish the call. Mobile Terminating Roaming Retry Call (MTRR) has been implemented to address this problem. If MTRR is implemented on the GMSC, when the UE transmits a location update, the HLR transmits a cancel location message to the first MSC. The first MSC aborts paging the UE and transmits a Resume Call Handling (RCH) message to the GMSC. The RCH message indicates whether MTRR is requested for this call.

When the GMSC receives a RCH message that indicates MTRR is requested, it terminates all ongoing CAP dialogues. After the location update is complete the GMSC reestablishes the CAP dialogues. Terminating and reestablishing the CAP dialogues can create an interruption in a subscriber's service. For example, if a caller's tune is being played to the calling party by a CAP dialogue, when the CAP dialogue is terminated the tune is stopped. When the CAP dialogue is terminated, the caller will no longer hear the tune and may hang up due to the lack of audio. Therefore, it is desirable to selectively terminate CAP dialogues, rather than terminate all CAP dialogues upon receipt of a RCH message by the GMSC when MTRR is enabled.

SUMMARY OF THE INVENTION

In one aspect, the invention features a method of selectively terminating a custom application in a mobile telecommunications network. The method involves receiving, by a GMSC, a request to initiate a call session to a subscriber device in a service area of first MSC. The method also involves, establishing, by the GMSC, a dialogue to implement the custom application on the subscriber device. The method also involves receiving, by the GMSC, a message indicating that the subscriber device is moving from the first MSC to a second MSC and analyzing, by the GMSC, a service key of the custom application to determine if the dialogue should be terminated and the custom application ceased. The method also involves determining, by the GMSC, that the dialogue should not be terminated so that the custom application is continued on the subscriber device.

In another aspect, the invention features a GMSC including a computing device configured to selectively terminate a custom application in a mobile telecommunications network. The computing device is operable to receive a request to initiate a call session to a subscriber device in a service area of a first MSC. The computing device is also operable to establish a dialogue to implement the custom application on the subscriber device and receive a message indicating that the subscriber device is moving from a first MSC to a second MSC. The computing device is also operable to analyze a service key of the custom application to determine if the dialogue should be terminated and the custom application ceased and determine that the dialogue should not be terminated so that the custom application is continued on the subscriber device.

In another aspect, the invention features a GMSC including means for receiving a request to initiate a call session to a subscriber device in a service area of first MSC. The GMSC also includes means for establishing a dialogue to implement the custom application on the subscriber device and means for receiving a message indicating that the subscriber device can be handed off from a first MSC to a second MSC. The GMSC also includes means for analyzing a service key of the custom application to determine if the dialogue should be terminated and the custom application ceased and means for determining that the dialogue should not be terminated so that the custom application is implemented on the subscriber device.

In other embodiments, any of the aspects, or any apparatus, device or system or method, process or technique described herein, can include one or more of the following features.

In some embodiments, the mobile telecommunications network supports Mobile Terminating Roaming Retry. In some embodiments, the message indicating that the subscriber device is moving is a RCH message received from the first MSC. In some embodiments, the service key comprises a control action configured by a service provider to indicate that the custom application should not be terminated. In some embodiments, the dialogue is an application level dialogue.

In some embodiments, the dialogue comprises a CAMEL application protocol. In some embodiments, the custom application is an intelligent network customized application. In some embodiments, the custom application comprises CAMEL.

In some embodiments, the method involves continuously providing the custom application without interruption after the GMSC determines that the dialogue should not be terminated. In some embodiments, the service key is configured, by the GMSC, based on a type of the customized application.

In some embodiments, the method involves receiving, by the GMSC, a request to establish the dialogue, analyzing, by the GMSC, a service key of the custom application to determine if the dialogue should be established, and determining, by the GMSC, that the dialogue should not be established.

One advantage of the process is that subscriber services can be maintained while roaming. Another advantage of the process is that each service provider can either specify services it wants to terminate or maintain.

Other aspects and advantages of the invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the invention, as well as the invention itself, will be more fully understood from the following description of various embodiments, when read together with the accompanying drawings.

DETAILED DESCRIPTION

In general overview, a GMSC receives a request to initiate a call to a UE. The GMSC establishes one or more CAP dialogues to implement custom applications on the UE. The UE is in the process of moving from a first MSC to a second MSC. The UE is transmitting a location update. The first MSC sends a RCH message to the GMSC. The RCH message includes an indicator that MTRR is applicable. The GMSC analyzes a service key of each CAP dialogue to selectively determine whether the CAP dialogue should be terminated or not.

Figure 1:
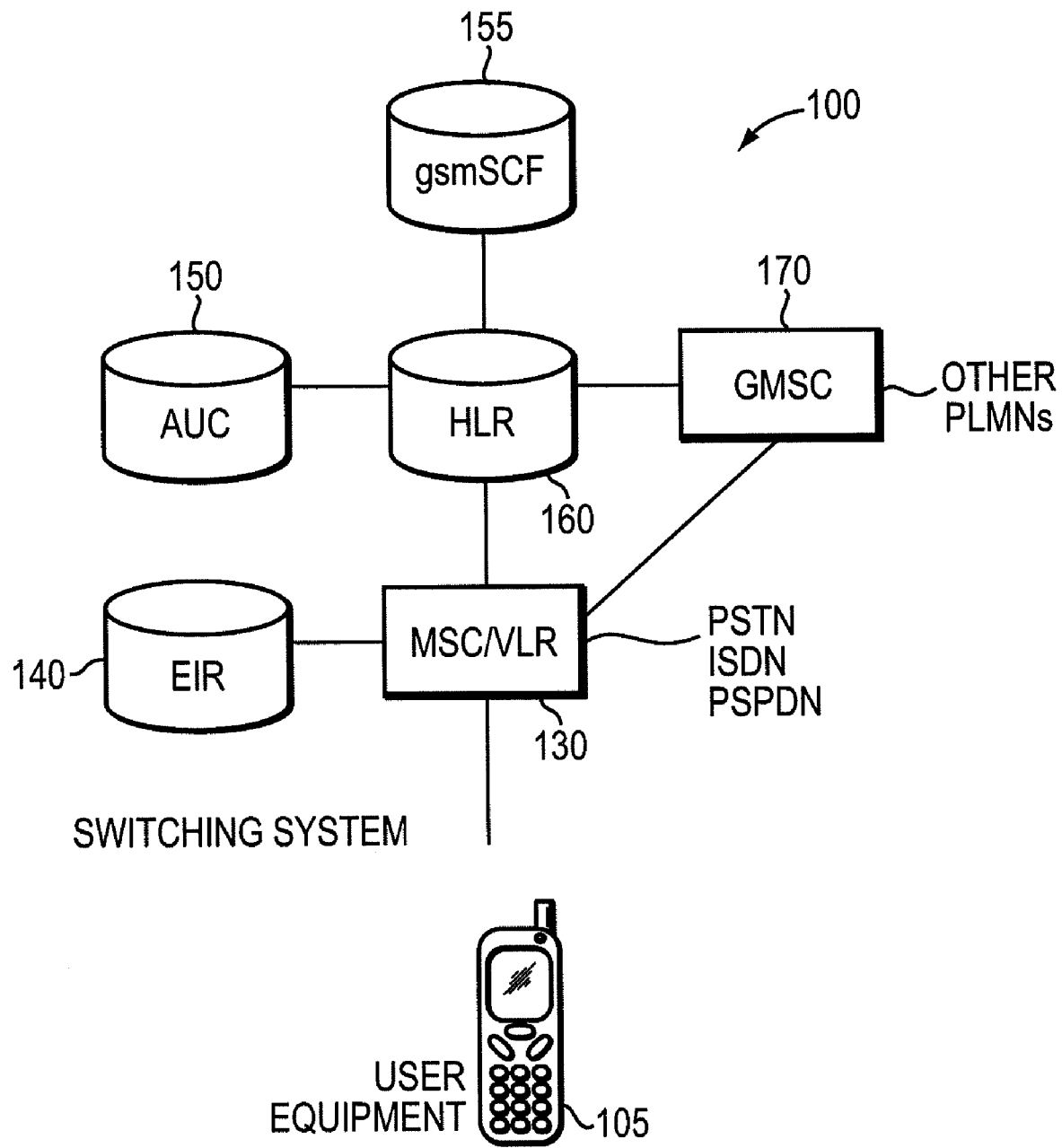
FIG. 1 is block diagram showing an exemplary GSM network.

FIG. 1 is block diagram showing an exemplary GSM network 100 including UE 105, a MSC 130, an Equipment Identity Register (EIR) 140, an Authorization Center (AUC) 150, a HLR 160, a GSM Service Control Function (gsmSCF) 155, and a GMSC 170 that interfaces with other Public Land Mobile Networks (PLMN). The GMSC 170 can include a Service Switching Function (SSF) (not shown). The gsmSCF 155 and the SSF are two elements used with CAMEL protocol. The SSF stores CAMEL features that are unique to a particular carrier. The gsmSCF 155 contains call processing steps for the CAMEL services. Communication between GSM network elements is defined by the 3GPP to enable data, speech, and mobile network technology to converge over an Internet Protocol (IP) based infrastructure. One of ordinary skill in the art can appreciate that the GSM network can include other network elements not shown in FIG. 1. Exemplary CAMEL services include video downloads, music downloads, prepaid service, automated call forwarding, and ring-back tone services.

Figure 2:
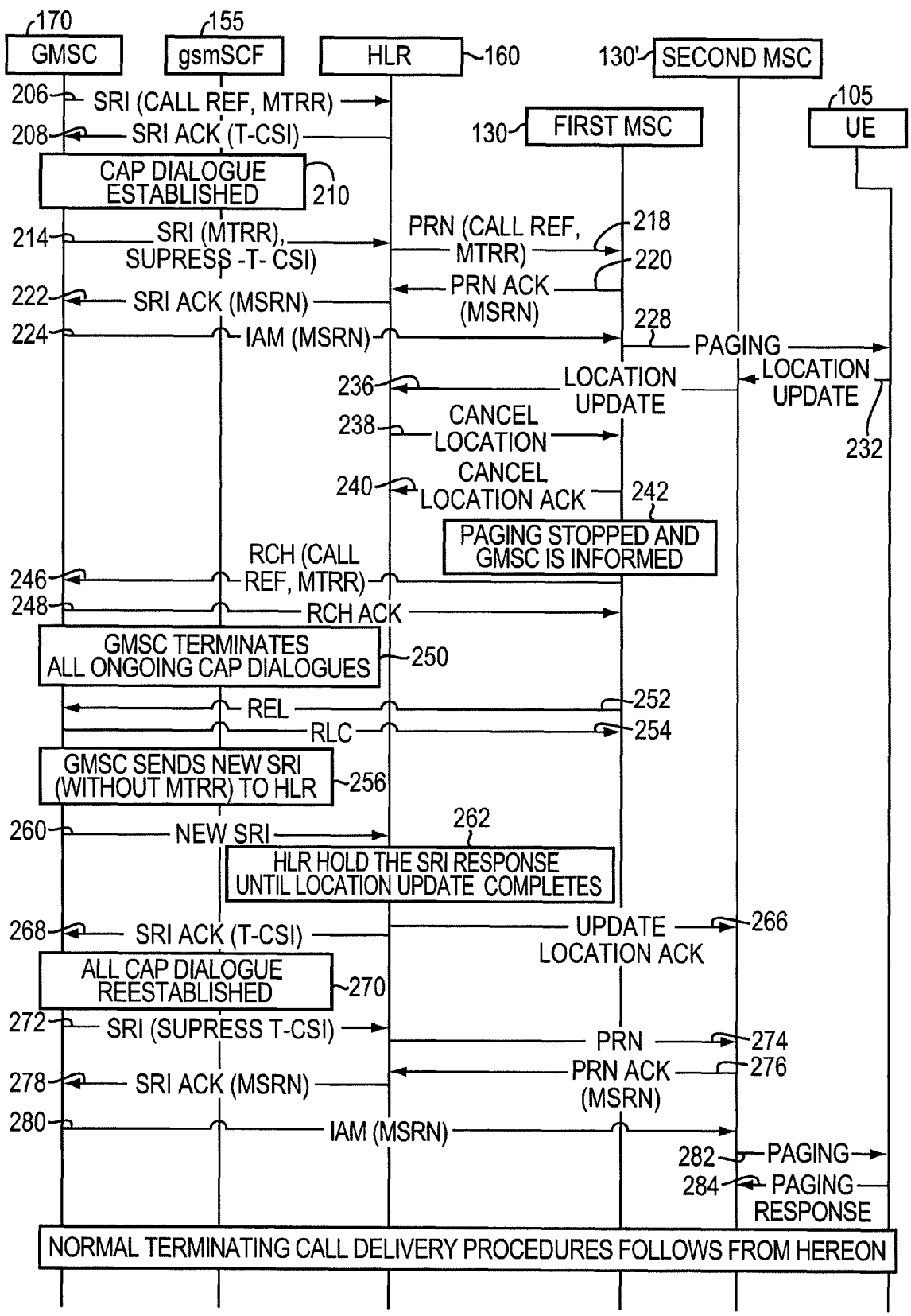
FIG. 2 is a sequence diagram of a GMSC terminating all CAP dialogues.

FIG. 2 is a sequence diagram of a GMSC terminating all CAP dialogues. A GMSC 170 receives a request (not shown) to initiate a call session to a UE 105. The GMSC 170 queries a HLR 160 for a temporary number (e.g., Mobile Subscriber Roaming Number (MSRN)) of the UE 105 by transmitting a Send Routing Information (SRI) message 206. The SRI message includes a reference to the UE 105, Call ref, and indicates that MTRR is supported. The HLR 160 returns an SRI acknowledgement (ACK) message 208 with Terminating CAMEL Subscription Information (T-CSI). The T-CSI identifies CAMEL services that are applicable to the UE 105. The T-CSI includes service keys and a gsmSCF address where service logic that corresponds to the service keys reside. The GMSC 170 establishes CAP dialogues 210 with a gsmSCF 155.

The GMSC 170 queries the HLR 160 with a second request for the temporary number of the UE 105 by transmitting a SRI message 214. The SRI message 214 indicates to the HLR 160 not to send a T-CSI in the SRI ACK with a suppress T-CSI indicator. The SRI message 214 indicates to the HLR 160 that MTRR is supported. The HLR 160 requests the temporary number from a first MSC 130 by transmitting a Provide Roaming Number (PRN) message 218. The PRN message 218 includes the reference to the UE 105 and an indicator that MTRR is implemented. The first MSC 130 transmits a PRN ACK message 220 that includes the temporary number (MSRN) to the HLR 160. The HLR 160 transmits an SRI ACK message 222 including the temporary number to the GMSC 170.

The GMSC 170 forwards an Integrated Service Digital Network (ISDN) User Part (ISUP) Initial Address Message (IAM) message 224 to the first MSC 130. The IAM message 224 includes the MSRN. The first MSC 130 pages the UE 105 by transmitting a paging message 228 to the UE 105. The UE 105 does not respond to the paging message 228 because the UE 105 has moved from a geographic location served by the first MSC 130 to a geographic location served by a second MSC 130' during the call initiation request. The UE 105 transmits a location update message 232 to the second MSC 130'. The second MSC 130' informs the HLR 160 that the UE 105 is within its service area by transmitting a location update message 236 to the HLR 160. The HLR 160 informs the first MSC 130 that the UE 105 is no longer in the first MSC's 130 service area by transmitting cancel location message 238 to the first MSC 130. The first MSC 130 transmits a cancel location ACK message 240 to the HLR 160. The first MSC 130 stops paging the UE 105 and transmits a RCH message 246 to the GMSC 170. The RCH message 246 includes the reference to the UE 105 and an indicator that MTRR is implemented.

Upon receipt of the RCH message 246, the GMSC 170 transmits an RCH ACK message 246 to the first MSC 130. The GMSC 170 terminates all ongoing CAP dialogues 250. The GMSC 170 releases the call request towards the first MSC 130 by transmitting a release (REL) message 252 to the first MSC 130. The first MSC 130 releases the call request and transmits a release complete (RLC) message 254 to the GMSC 170.

The GMSC 170 transmits a new SRI message 260 to the HLR 160. The new SRI message 260 does not contain a MTRR indicator. The HLR 160 holds the SRI response message 262 until the location update is complete. The HLR 160 transmits an update location ACK message 266 to the second MSC 130'. Subsequently, the HLR 160 transmits an SRI ACK message 268 including T-CSI to the GMSC 170.

The GMSC 170 reestablishes the CAP dialogues 270. The GMSC 170 queries the HLR 160 with a second request for the temporary number of the UE 105 by transmitting a SRI message 272. The SRI message 272 indicates to the HLR 160 not to send a T-CSI in the SRI ACK with a suppress T-CSI indicator. The HLR 160 requests the temporary number from the second MSC 130' by transmitting a PRN message 274.

The second MSC 130' transmits a PRN ACK message 276 that includes the temporary number (MSRN) to the HLR 160. The HLR 160 transmits an SRI ACK message 278 including the temporary number to the GMSC 170.

The GMSC 170 forwards an ISUP IAM message 280 to the second MSC 130'. The ISUP IAM message 280 includes the MSRN. The second MSC 130' pages the UE 105 by transmitting a paging message 282 to the UE 105. The UE 105 transmits a paging response message 284 to the second MSC 130'. Call delivery is completed by typical call delivery procedures, according to 3GPP standards.

As shown above, the GMSC 170 communicates with the two MSC's 130 and 130' via the ISUP call control protocol. It is apparent to one of ordinary skill in the art that the GMSC 170 can communicate with the two MSC's via any call control protocol. For example, the call control protocol can be Bearer Independent Call Control or Session Initiation Protocol (SIP-I).

Figure 3:
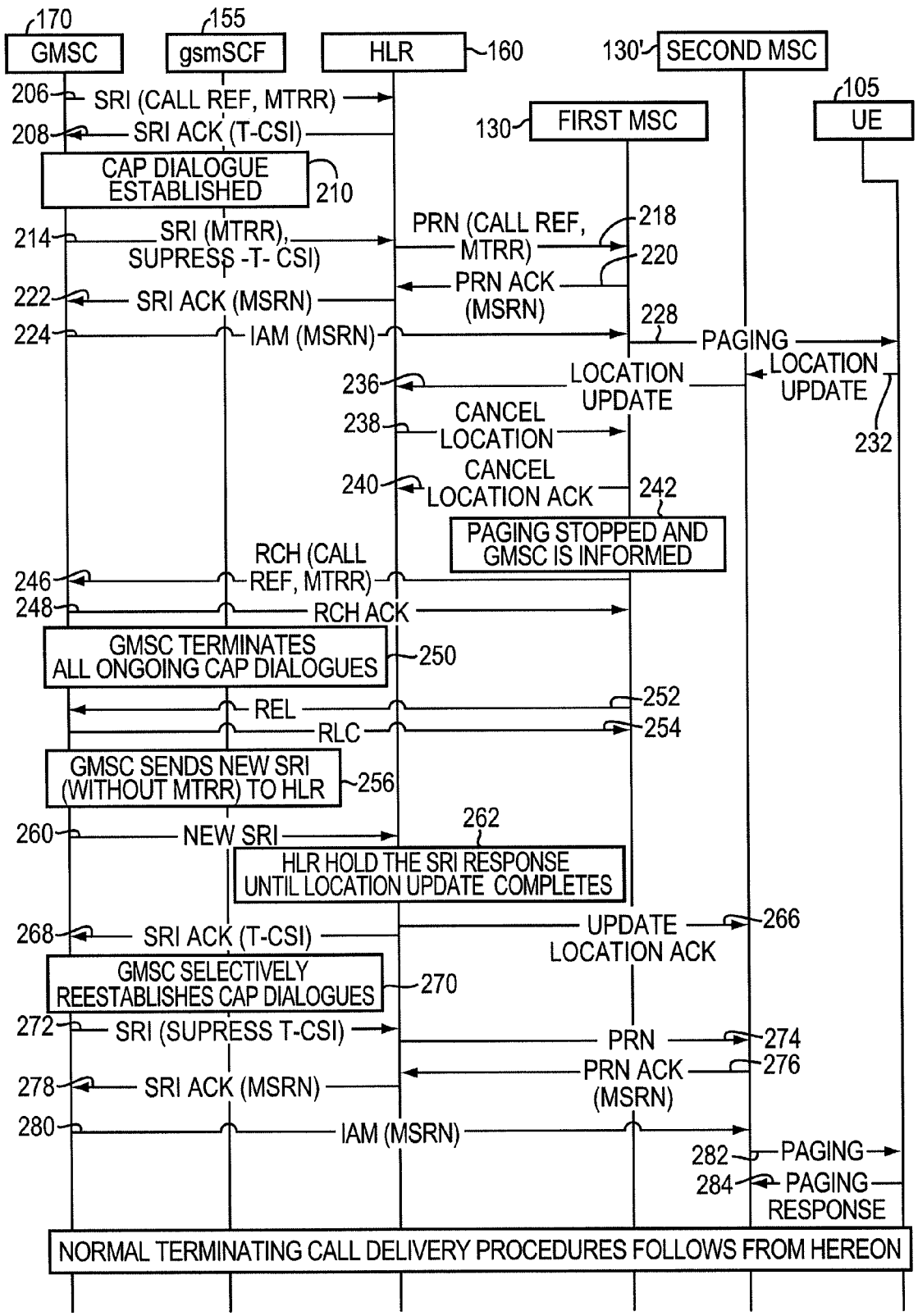
FIG. 3 is sequence diagram of a GMSC selectively terminating CAP dialogues.

FIG. 3 is a sequence diagram of a GMSC selectively terminating CAP dialogues. The transmission of messages or dialogues in FIG. 3 is substantially the same as the transmission of messages or dialogues transmitted in FIG. 2 until the receipt of the first RCH message 246 by the GMSC 170. For clarity purposes, the message flow is not repeated here.

Upon receipt of the RCH message 246, the GMSC 170 transmits an RCH ACK message 248 to the first MSC 130. The GMSC 170 determines whether each CAP dialogue should be terminated based on the service key of each CAP dialogue. The service key can include an associated control action that indicates whether or not the CAP dialogue should be terminated. The service key can be an integer value. The integer value in the service key can identify the service the CAP dialogue supports.

The control action can be set by an IN service provider. The service provider can set the control action by accessing the GMSC 170. For example, an IN service provider can indicate that all audio download CAP dialogues should be terminated but ring back tone CAP dialogues should not be terminated. The IN service provider can indicate the CAP dialogues that should be terminated and the CAP dialogues that should not be terminated by setting the control action.

The control action can be automatically assigned a default value based on the service the CAP dialogue supports. The default value can be assigned by the GMSC 170. For example, the GMSC 170 can always assign control action equal to do not terminate for all ring tone CAP dialogues.

The GMSC 170 terminates the CAP dialogues that it determines should be terminated and does not terminate the CAP dialogues that it determines should not be terminated 302. The GMSC 170 releases the call request towards the first MSC 130 by transmitting a REL message 304 to the first MSC 130. The first MSC 130 releases the call request and transmits a RLC message 306 to the GMSC 170.

The GMSC 170 transmits a new SRI message 310 to the HLR 160. The new SRI message 310 does not contain a MTRR indicator. The HLR 160 holds the SRI response message 312 until the location update is complete. The HLR 160 transmits an update location ACK message 314 to the second MSC 130'. Then the HLR 160 transmits an SRI ACK message 318 including T-CSI to the GMSC 170.

The GMSC 170 reestablishes the CAP dialogues that it terminated, and does not reestablish the CAP dialogues that it did not terminate 320. The GMSC 170 queries the HLR 160 with a second request for the temporary number of the UE 105 by transmitting a SRI message 322. The SRI message 272 indicates to the HLR 160 not to send a T-CSI in the SRI ACK with a suppress T-CSI indicator. The HLR 160 requests the temporary number from the second MSC 130' by transmitting a PRN message 324. The second MSC 130' transmits a PRN ACK message 326 that includes the temporary number (MSRN) to the HLR 160. The HLR 160 transmits an SRI ACK message 328 including the temporary number to the GMSC 170.

The GMSC 170 forwards an ISUP IAM message 330 to the second MSC 130'. The ISUP IAM message 280 includes the MSRN. The second MSC 130' pages the UE 105 by transmitting a paging message 332 to the UE 105. The UE 105 transmits a paging response message 334 to the second MSC 130'. Call delivery is completed by typical call delivery procedures, according to 3GPP standards.

Whether or not a CAP dialogue should be terminated can depend on the service key of other CAP dialogues. For example, a first CAP dialogue can have a service key equal to 1, a second CAP dialogue can have a service key equal to 2. The GMSC can terminate the first CAP dialogue only if the second CAP dialogue has a service key equal to 3. The GMSC can terminate the second CAP dialogue if the first CAP dialogue has a service key equal to 1. In this example, the first CAP dialogue is not terminated and the second CAP dialogue is terminated. In another example, the first CAP dialogue and the second CAP dialogue are both terminated. In another example, the first CAP dialogue is terminated and the second CAP dialogue is not terminated. In another example, the first CAP dialogue and the second CAP dialogue are terminated.

Whether or not the CAP dialogue should be terminated can depend on the type of CAMEL service the CAP dialogue provides. For example, it can be desirable to maintain video downloads, music downloads, prepaid service, automated call forwarding, and ring-back tone services. It can be desirable to terminate prepaid call services and dialing over a Virtual Private Network (VPN).

The above described techniques can be implemented in a variety of ways. The components of the system can be interconnected by any form or medium of digital data communication (e.g., a communication network). The system can include clients and servers. A client and a server are generally remote from each other and typically interact through a communication network. The relationship of client and server arises by virtue of computer programs running on the respective computers and having a client-server relationship to each other.

The above described techniques can be implemented by packet-based networks and/or circuit-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Transmitting devices can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art can appreciate the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of selectively terminating a custom application in a mobile telecommunications network, comprising:
   receiving, by a Gateway Mobile Switching Center (GMSC), a request to initiate a call session to a subscriber device in a service area of a first Mobile Switching Center (MSC);
   establishing, by the GMSC, a dialogue to implement the custom application on the subscriber device;
   receiving, by the GMSC, a message indicating that the subscriber device is moving from the first MSC to a second MSC;
   analyzing, by the GMSC, a service key of the custom application to determine whether or not the dialogue should be terminated and the custom application ceased; and
   in response to determining, by the GMSC, that the dialogue should not be terminated, continuing the custom application on the subscriber device.

2. The method of claim 1 wherein the mobile telecommunications network supports Mobile Terminating Roaming Retry.

3. The method of claim 1 wherein the message indicating that the subscriber device is moving is a Resume Call Handling (RCH) message received from the first MSC.

4. The method of claim 1 wherein the service key comprises a control action configured by a service provider to indicate that the custom application should not be terminated.

5. The method of claim 4 wherein the dialogue is an application level dialogue.

6. The method of claim 4 wherein the dialogue comprises a Customized Applications for Mobile networks Enhanced Logic (CAMEL) application protocol.

7. The method of claim 1 wherein the custom application is an intelligent network (IN) customized application.

8. The method of claim 1 wherein the custom application comprises CAMEL.

9. The method of claim 1 further comprising continuously providing the custom application without interruption after the GMSC determines that the dialogue should not be terminated.

10. The method of claim 1 wherein the service key is configured, by the GMSC, based on a type of the custom application.

11. The method of claim 1 further comprising:
    receiving, by the GMSC, a request to establish the dialogue; and
    analyzing, by the GMSC, said service key of the custom application to determine whether or not the dialogue should be established.

12. The method of claim 1 further comprising:
    establishing, by the GMSC, a plurality of dialogues to implement a plurality of custom applications on the subscriber device, each custom application having a customer application service key;
    analyzing, by the GMSC, the customer application service key of a first custom application to determine whether or not a dialogue corresponding to the first custom application should be terminated and the first custom application ceased; and
    determining, by the GMSC, based on a service key corresponding to a second custom application that a dialogue corresponding to the second custom application should not be terminated.

13. A computing device for use in a system which performs mobile switching, the computing device being configured to:
    receive a request to initiate a call session to a subscriber device in a service area of a first Mobile Switching Center (MSC);
    establish a dialogue to implement a custom application on the subscriber device;
    receive a message indicating that the subscriber device is moving from a first MSC to a second MSC;
    analyze a service key of the custom application to determine whether or not the dialogue should be terminated and the custom application ceased; and
    in response to determining that the dialogue should not be terminated, continue the custom application on the subscriber device.

* * * * *